(12) United States Patent
Esaki et al.

(10) Patent No.: US 8,480,371 B2
(45) Date of Patent: Jul. 9, 2013

(54) WIND TURBINE ROTOR BLADE AND WIND-GENERATING WIND TURBINE

(75) Inventors: Kouji Esaki, Tokyo (JP); Shinichi Hori, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/072,141

(22) Filed: Mar. 25, 2011

(65) Prior Publication Data

US 2011/0171036 A1 Jul. 14, 2011

Related U.S. Application Data

(63) Continuation of application No. PCT/JP2010/073347, filed on Dec. 24, 2010.

(30) Foreign Application Priority Data

Dec. 25, 2009 (JP) ................................. 2009-296159

(51) Int. Cl.
*F01D 5/16* (2006.01)

(52) U.S. Cl.
USPC ...................................... 416/229 R; 416/226

(58) Field of Classification Search
USPC ................... 416/229 R, 230, 229 A, 233, 226, 416/223 R See application file for complete search history.

(56) References Cited

U.S. PATENT DOCUMENTS

| | | | |
|---|---|---|---|
| 4,329,119 A * | 5/1982 | Baskin | 416/226 |
| 4,643,646 A | 2/1987 | Hahn et al. | |
| 2008/0107540 A1* | 5/2008 | Bonnet | 416/229 R |
| 2008/0187442 A1 | 8/2008 | Standish et al. | |
| 2008/0286110 A1 | 11/2008 | Gupta et al. | |
| 2009/0169392 A1 | 7/2009 | Kuroiwa et al. | |
| 2009/0324412 A1* | 12/2009 | Roorda | 416/204 R |
| 2010/0008789 A1 | 1/2010 | Jensen | |

FOREIGN PATENT DOCUMENTS

| | | |
|---|---|---|
| JP | S48-21720 Y1 | 6/1973 |
| JP | S48-104118 U1 | 12/1973 |
| JP | 2000-120524 | 4/2000 |
| JP | 2001-165033 | 6/2001 |

* cited by examiner

*Primary Examiner* — Nathaniel Wiehe
*Assistant Examiner* — Joshua R Beebe
(74) *Attorney, Agent, or Firm* — Manabu Kanesaka; Kenneth M. Berner; Benjamin J. Hauptman

(57) ABSTRACT

A wind turbine rotor blade having an outer skin material made of fiber-reinforced plastic, a sheer web, and a trailing edge reinforcing material made of fiber-reinforced plastic which forms a trailing edge, wherein the trailing edge reinforcing material includes a first recess in which a trailing edge side end of the outer skin material is accommodated, and a second recess in which a trailing edge side of an overlay is accommodated, a third recess in which a leading edge side of the overlay is accommodated is formed in a trailing edge side tip end of the outer skin material, and the tip end of the outer skin material is fixed to the first recess through an adhesive.

8 Claims, 4 Drawing Sheets

WIND TURBINE ROTOR BLADE AND WIND-GENERATING WIND TURBINE

CROSS REFERENCE TO RELATED APPLICATIONS

This application is a continuation application of PCT/JP2010/073347 filed on Dec. 24, 2010 and claims the benefit of Japanese Application No. 2009-296159 filed in Japan on Dec. 25, 2009, the contents of which is hereby incorporated by its reference.

BACKGROUND OF THE INVENTION

1. Field of the Invention

The present invention relates to a wind turbine rotor blade constituting a wind-generating wind turbine, and to the wind-generating wind turbine.

2. Description of Related Art

As a wind turbine rotor blade, one disclosed in WO2008/086805A2 is known for example.

In recent years, there is proposed a wind turbine rotor blade 100 having a super cap structure which satisfies both lightweight requirement and strength requirement as shown in FIG. 6. The wind turbine rotor blade 100 includes a later-described outer skin material 11, leading edge sandwich materials 12, super cap materials (main strength materials) 13, trailing edge sandwich materials 14 and sheer webs (crossbeam materials) 15.

The leading edge sandwich materials 12 and the trailing edge sandwich materials 14 have a sandwich structure in which the outer skin material 11 and the inner skin material 17 form a skin material, and a resin foam body such as PVC and wood material such as balsa form a core material.

In FIG. 6, a symbol 16 represents an adhesive 16 which connects (couples) the super cap materials 13 and the sheer webs 15 to each other.

If a safety factor of a buckling strength and safety factors of material strengths (tensile strength and strength against compression) of members constituting the wind turbine rotor blade 100 (specifically the outer skin material 11, the leading edge sandwich material 12, the super cap material 13, the trailing edge sandwich material 14 and the sheer web 15) can substantially be set equal to each other (e.g., 2), it is possible to further reduce the weight of the wind turbine rotor blade.

According to the wind turbine rotor blade 100 shown in FIG. 6, however, there is an adverse possibility that the super cap material 13 is buckled by a load in a flap direction (longitudinal direction: vertical direction in FIG. 6) before the wind turbine rotor blade 100 exerts 100% material strength, the trailing edge sandwich material 14 and/or a back side and/or front side of the outer skin material 11 located closer to a trailing edge 18 than a trailing edge end of the trailing edge sandwich material 14 is buckled by a load in an edge direction (directions of a leading edge and a trailing edge: direction perpendicular to the flap direction).

To increase a buckling strength of the super cap material 13 against a load in the flap direction, a cross-sectional area of the super cap material 13 is maintained constant, a width of the super cap material 13 (length in a cord direction (lateral direction in FIG. 6)) is reduced, a thickness of the super cap material 13 is increased, and an interval between the sheer webs 15 (distance between the sheer web 15 located on the side of the leading edge and the sheer web 15 located on the side of the trailing edge) is reduced.

However, there is a problem that a width of the trailing edge sandwich material 14 (length in the cord direction (lateral direction in FIG. 6)) is increased, and the buckling strength of the trailing edge sandwich material 14 against a load in an edge direction is further deteriorated.

BRIEF SUMMARY OF THE INVENTION

The present invention has been accomplished in view of the above circumstances, and it is an object of the invention to provide a wind turbine rotor blade and a wind-generating wind turbine capable of enhancing a buckling strength against a load in an edge direction, capable of bringing a safety factor of the buckling strength close to a safety factor of a material strength, and capable of further reducing a weight of each of the wind turbine rotor blades and the wind-generating wind turbine.

To solve the above problem, the present invention employed the following means.

A wind turbine rotor blade according to a first aspect of the invention includes an outer skin material made of fiber-reinforced plastic, a sheer web, and a trailing edge reinforcing material made of fiber-reinforced plastic which forms a trailing edge, wherein the trailing edge reinforcing material includes a first recess in which a trailing edge side end of the outer skin material is accommodated, and a second recess in which a trailing edge side of an overlay is accommodated, a third recess in which a leading edge side of the overlay is accommodated is formed in a trailing edge side tip end of the outer skin material, and the tip end of the outer skin material is fixed to the first recess through an adhesive.

According to the wind turbine rotor blade of the first aspect of the invention, a thickness of the outer skin material located closer to the trailing edge than the trailing edge end of the trailing edge sandwich material is increased by the reinforcing material disposed on the inner surface thereof. Therefore, it is possible to enhance bending rigidity of the trailing edge in the edge direction, a buckling strength of the trailing edge against a load in the edge direction can be enhanced. A safety factor of the buckling strength can be brought close to a safety factor of the material strength, and it is possible to further reduce the weight.

The tip end of the outer skin material is accommodated in the first recess, fixed to the first recess through the adhesive, and the tip end of the outer skin material and the trailing edge reinforcing material are strongly connected (coupled) to each other by the overlay laminated in the second recess and the third recess. Therefore, it is possible to prevent the trailing edge reinforcing material from separating (disengaging) from the tip end of the outer skin material, and the reliability of the blade itself can be enhanced.

A wind turbine rotor blade according to a second aspect of the invention includes an outer skin material made of fiber-reinforced plastic, a sheer web, and a trailing edge reinforcing material made of fiber-reinforced plastic which forms a trailing edge, wherein the trailing edge reinforcing material includes a first recess in which a trailing edge side of an overlay is accommodated, and a second recess in which a leading edge side of the overlay is accommodated is formed in a trailing edge side tip end of the outer skin material.

According to the wind turbine rotor blade of the second aspect of the invention, a thickness of the outer skin material located closer to the trailing edge than the trailing edge end of the trailing edge sandwich material is increased by the reinforcing material disposed on the inner side surface of the outer skin material. Therefore, it is possible to enhance bending rigidity of the trailing edge in the edge direction, and a buckling strength of the trailing edge against a load in the edge direction can be enhanced. A safety factor of the buckling strength can be brought close to a safety factor of the material strength, and it is possible to further reduce the weight.

The tip end of the outer skin material and the trailing edge reinforcing material are strongly connected (coupled) to each other by the overlay laminated in the first recess and the second recess. Therefore, it is possible to prevent the trailing edge reinforcing material from separating (disengaging) from the tip end of the outer skin material, and the reliability of the blade itself can be enhanced.

In the wind turbine rotor blade, it is preferable that a surface of the outer skin material which is exposed outside, a surface of the overlay and a surface of the trailing edge reinforcing material which is exposed outside are formed such that these surfaces form a smooth continuous surface.

According to such a wind turbine rotor blade, the overlay is accommodated in the second and third recesses or in the first and second recesses such that the surface of the outer skin material which is exposed to outside, the surface of the overlay and the surface of the trailing edge reinforcing material which is exposed outside form the smooth continuous surface. Therefore, the blade surface of the trailing edge can smoothly be maintained, and noise and drag generated when the blades rotate can be suppressed.

In the wind turbine rotor blade, it is preferable that a portion of the trailing edge reinforcing material is made of lightweight core material.

According to the wind turbine rotor blade, the portion of the trailing edge reinforcing material is formed (configured) from the lightweight core material made of resin foam body such as PVC or wood material such as balsa. Therefore, the trailing edge reinforcing material can be reduced in weight, and the entire wind turbine rotor blade can be reduced in weight.

A wind-generating wind turbine according to a third aspect of the invention includes the wind turbine rotor blade capable of enhancing the bending rigidity of the trailing edge in the edge direction, capable of enhancing the buckling strength of the trailing edge against a load in the edge direction, capable of bringing the safety factor of the buckling strength close to the safety factor of the material strength, and capable of further reducing the weight.

According to the wind-generating wind turbine of the third aspect of the invention, it is possible to reduce, in weight, the rotation bearing which connects the rotor head and the root portion of the wind turbine rotor blade to each other, and the connecting shaft which is disposed in the rotor head and which gives rotating motion to the wind turbine blade. A load applied to the tower which supports the wind turbine rotor blades and the rotor head can be reduced.

According to the wind turbine rotor blade of the invention, it is possible to enhance a buckling strength against a load in an edge direction, bring a safety factor of the buckling strength close to a safety factor of a material strength, and further reduce a weight of the wind turbine rotor blade.

DETAILED DESCRIPTION OF THE INVENTION

A first embodiment of wind turbine rotor blades according to the present invention will be described with reference to FIGS. 1 to 3.

Figure 1:
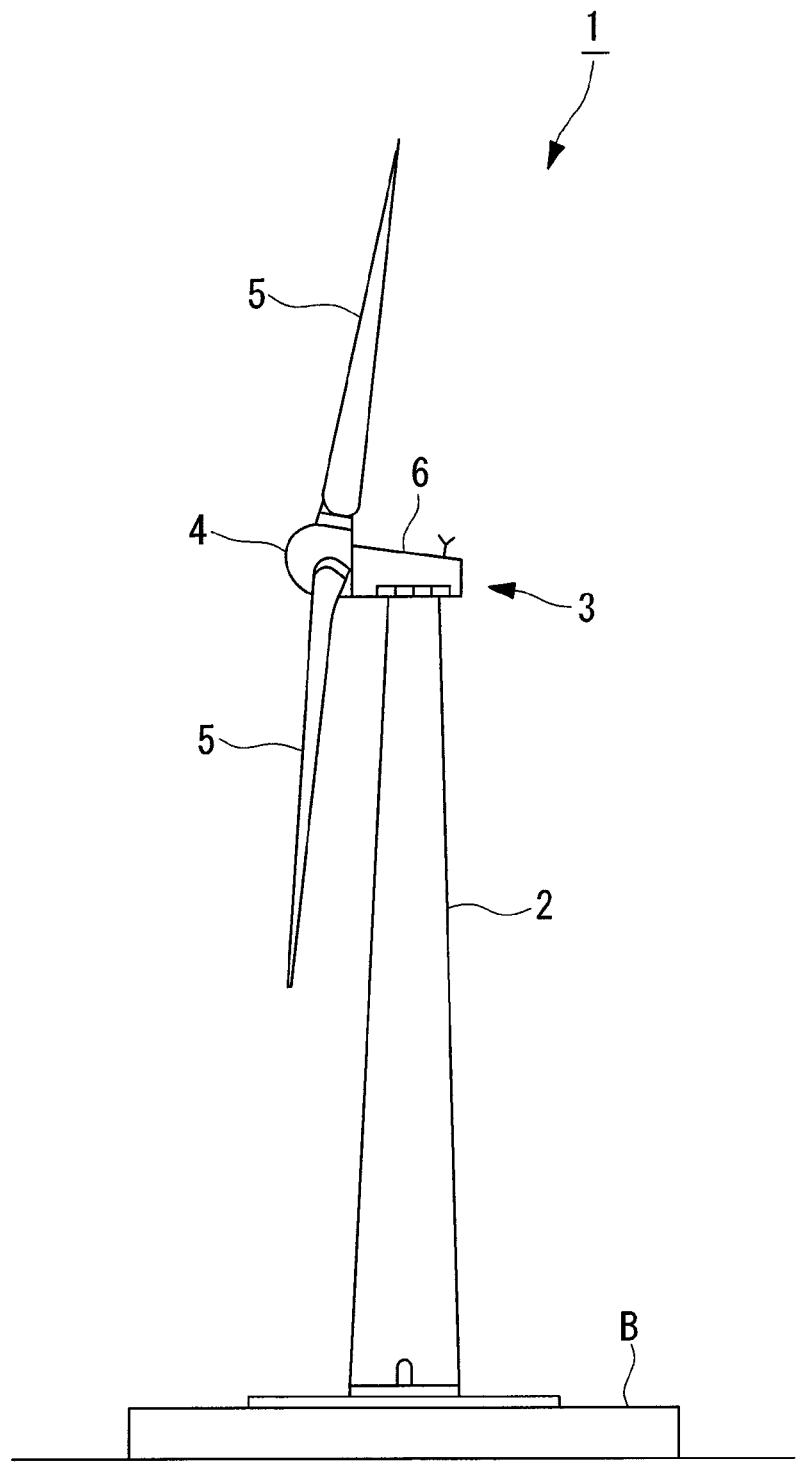
FIG. 1 is a side view showing a wind-generating wind turbine having wind turbine rotor blades according to a first embodiment of the present invention.

FIG. 1 is a side view showing a wind-generating wind turbine having the wind turbine rotor blades according to the first embodiment of the present invention. FIG. 2 is a sectional view of the wind turbine rotor blade of the embodiment. FIG. 3 is an enlarged sectional view of an essential portion in FIG. 2.

As shown in FIG. 1, the wind-generating wind turbine 1 includes a column (also called "tower") 2 standing on a foundation B, a nacelle 3 disposed on an upper end of the column 2, and a rotor head 4 provided on a nacelle 3 such that the rotor head 4 can rotate around a substantially horizontal axis.

A plurality of (e.g., three) wind turbine rotor blades 5 are radially mounted on the rotor head 4 around its rotation axis. According to this, a force of wind which impinges on the wind turbine rotor blades 5 from a direction of the rotation axis of the rotor head 4 is converted into power which rotates the rotor head 4 around its rotation axis.

The column 2 is formed by connecting a plurality of (e.g., three) units (not shown) in the vertical direction.

The nacelle 3 is disposed on the uppermost one of the units which constitute the column 2. The nacelle 3 includes a nacelle bed plate (not shown) mounted on the upper end of the column 2, and a cover 6 covering the nacelle bed plate from above.

Figure 2:
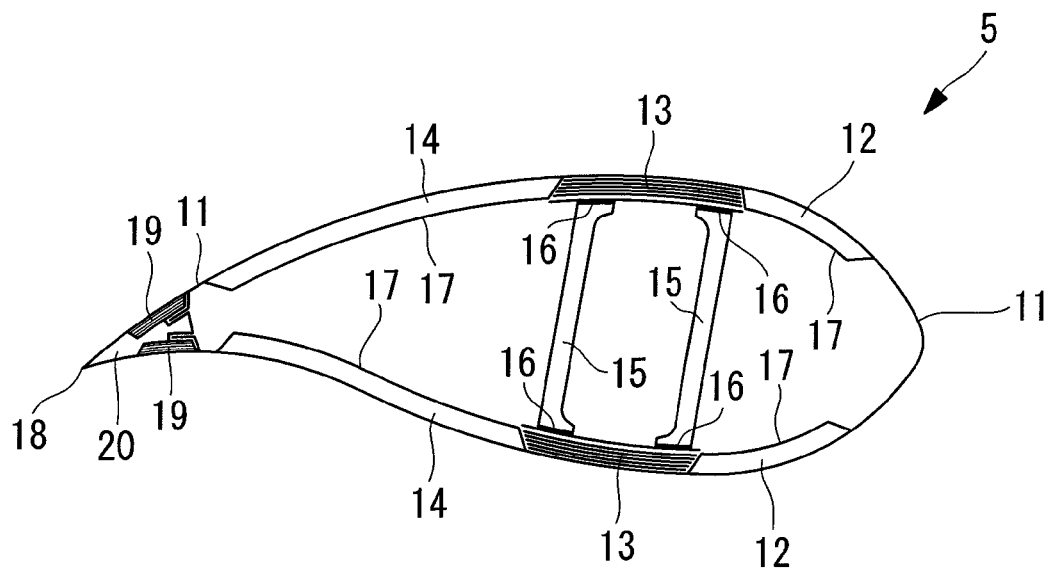
FIG. 2 is a sectional view of the wind turbine rotor blade of the first embodiment of the invention.

As shown in FIG. 2, each of the wind turbine rotor blades 5 is formed as a super cap structure which satisfies both lightweight requirement and strength requirement. The wind turbine rotor blade 5 includes outer skin materials 11, leading edge sandwich materials 12, super cap materials (main strength material) 13, trailing edge sandwich materials 14 and sheer webs (crossbeam materials) 15.

The outer skin mate 11, the super cap material 13 and the inner skin material 17 are formed (made) of fiber-reinforced plastic (FRP). The super cap material 13 is formed by laminating many fiber-reinforced plastic layers on one another. The super cap materials 13 are provided on a back side and a front side of the wind turbine rotor blade 5 one each such that the super cap materials 13 are in contact with end surfaces of back sides (upper sides in FIG. 2) of the sheer webs 15 and in contact with end surfaces of front sides (lower sides in FIG. 2) of the sheer webs 15. The super cap materials 13 and the sheer webs 15 are connected (coupled) to each other through an adhesive 16 which is cured at room temperature.

The leading edge sandwich material 12 and the trailing edge sandwich material 14 have a sandwich structure in which the outer skin material 11 and the inner skin material 17 form a skin material, and a resin foam body such as PVC and wood material such as balsa form a core material.

According to the super cap structure, the bending strength of the wind turbine rotor blade 5 in a flap direction is maintained mainly by the super cap material 13 made of fiber-reinforced plastic. The leading edge sandwich material 12 and the trailing edge sandwich material 14 are auxiliary used for maintaining the buckling strength of the wind turbine rotor blade 5.

In the wind turbine rotor blade 5 of the embodiment, a trailing edge reinforcing material 20 forming a trailing edge is provided (disposed) together with a later-described overlay 19 at a location closer to a trailing edge 18 than a trailing edge end of the trailing edge sandwich material 14.

Figure 3:
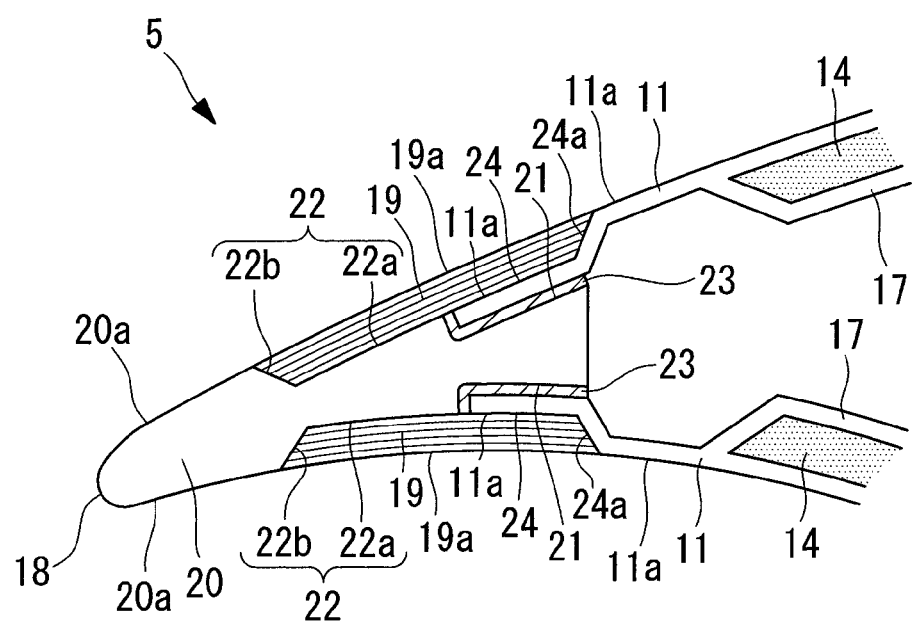
FIG. 3 is an enlarged sectional view of an essential portion in FIG. 2.

As shown in FIG. 2 or 3, the trailing edge reinforcing material 20 is formed by laminating, on one another, many fiber-reinforced plastic layers in which reinforced fibers (not shown) are oriented in a blade longitudinal direction of the wind turbine rotor blade 5 (direction perpendicular to sheet surfaces of FIGS. 2 and 3). The trailing edge reinforcing material 20 includes first recesses 21 in which tip ends of the outer skin materials 11 (end on the trailing edge side) are accommodated, and second recesses 22 in which one sides of the overlay 19 (on the side of the trailing edge) are accommodated. A depth of the first recess 21 is set such that a surface 11a of the outer skin material 11 and a bottom surface 22a of the second recess 22 form a (substantially) smooth continuous surface when a tip end of the outer skin material 11 is mounted on (connected (coupled) to)) the first recess 21 through an adhesive 23 which is cured at room temperature. A depth of the second recess 22 is set such that a surface 11a of the outer skin material 11 which is exposed outside, a surface 19a of the overlay 19, and a surface 20a of the trailing edge reinforcing material 20 which is cured at room temperature which is exposed outside form a (substantially) smooth continuous surface when the overlay 19 having a thickness which is required for connecting (coupling) the outer skin material 11 and the trailing edge reinforcing material 20 to each other is mounted on (connected (coupled) to)) the second recess 22 and each of later-described third recesses 24. A side surface 22b of the second recess 22 which extends from the bottom surface 22a of the second recess 22 to the trailing edge side, a blade tip end side and a blade root side has a predetermined gradient (about ⅕ to 1/20) from the bottom surface 22a toward the surface 20a.

The tip end of the outer skin material 11 includes the third recess 24 in which the other side (leading edge side) of the overlay 19 is accommodated. A depth of the third recess 24 is set such that the surface 11a of the outer skin material 11 and the bottom surface 22a of the second recess 22 form a (substantially) smooth continuous surface when the tip end of the outer skin material 11 is mounted on the first recess 21 through the adhesive 23 which is cured at room temperature, and such that the surface 11a of the outer skin material 11 which is exposed outside, the surface 19a of the overlay 19 and the surface 20a of the trailing edge reinforcing material 20 which is exposed outside form a (substantially) smooth continuous surface when the overlay 19 having a thickness which is required for coupling the outer skin material 11 and the trailing edge reinforcing material 20 to each other is mounted on the second recess 22 and the third recess 24. A side surface 24a of the third recess 24 extending from the surface 11a of the outer skin material 11 forming the bottom surface of the third recess 24 toward the leading edge side, the blade tip end side and the blade root side has a predetermined gradient (about ⅕ to 1/20) from the surface 11a of the outer skin material 11 forming the bottom surface of the third recess 24 toward the surface 11a of the outer skin material 11 which is exposed outside.

Each of the overlays 19 is formed by a hand lay-up method in which resin-impregnated reinforced fibers (such as carbon fibers, glass fibers and aramid fibers) are laminated on one another as shown in FIG. 3 in a recess (mold) including the second recess 22 and the third recess 24 formed by mounting the tip end of the outer skin material 11 on the first recess 21 through the adhesive 23 which is cured at room temperature, the fibers are crumpled using a roller to squeeze out redundant resin and air, and the overlay 19 is left at room temperature and cured, or by a vacuum impregnation method in which laminated fibers are covered with a cover and vacuumed and impregnated with resins.

According to the wind turbine rotor blade 5 of the embodiment, since the trailing edge is configured (formed) from the strong trailing edge reinforcing material 20 which is less prone to be deformed, it is possible to enhance the bending rigidity of the trailing edge in the edge direction, to enhance the buckling strength of the trailing edge against a load in the edge direction, to bring a safety factor of the buckling strength close to a safety factor of the material strength, and to reduce the weight.

As a result, even if a width of the trailing edge sandwich material 14 (length in a cord direction (lateral direction in FIG. 2)) is increased, the buckling strength of the trailing edge sandwich material 14 against the load in the edge direction can be prevented from being lowered. Therefore, an interval between the sheer webs 15 in the cord direction, i.e., a distance between the sheer web 15 located on the side of the leading edge and the sheer web 15 located on the side of the trailing edge can be reduced. Therefore, it is possible to reduce the width of the super cap material 13 (at that time, the super cap material 13 is thickened while equally maintaining the cross-sectional area of the super cap material 13), and the buckling strength of the super cap material 13 against the load in the flap direction can be enhanced.

The tip end of the outer skin material 11 is accommodated in the first recess 21, fixed to the first recess through the adhesive 23, and the tip end of the outer skin material 11 and the trailing edge reinforcing material 20 are strongly connected (coupled) to each other by the overlay 19 laminated in the second recess 22 and the third recess 24. Therefore, it is possible to prevent the trailing edge reinforcing material 20 from separating (disengaging) from the tip end of the outer skin material 11, and the reliability of the blade itself can be enhanced.

The overlay 19 is accommodated in the second recess 22 and the third recess 24 such that the surface 11a of the outer skin material 11 which is exposed outside, the surface 19a of the overlay 19 and the surface 20a of the trailing edge reinforcing material 20 which is exposed outside form the (substantially) smooth continuous surface. Therefore, the blade surface of the trailing edge can smoothly be maintained, and noise and drag generated when the blades rotate can be suppressed.

According to the wind turbine rotor blade 5 of the embodiment, since the reinforced fibers constituting the trailing edge reinforcing material 20 are arranged along the blade longitudinal direction, it is possible to further enhance the bending rigidity of the trailing edge in the edge direction, and to enhance the buckling strength of the trailing edge against the load in the edge direction. It is possible to bring the safety factor of the buckling strength close to the safety factor of the material strength, and the weight can further be reduced.

According to the wind-generating wind turbine 1 having the wind turbine rotor blades 5 of the embodiment, it is possible to reduce, in weight, the rotation bearing which connects the rotor head and the root portion of the wind turbine rotor blade to each other, and the connecting shaft which is disposed in the rotor head and which gives rotating motion to the wind turbine blade. A load applied to the tower 2 which supports the wind turbine rotor blades 5 and the rotor head 4 can be reduced.

A second embodiment of the wind turbine rotor blade of the present invention will be described with reference to FIG. 4.

Figure 4:
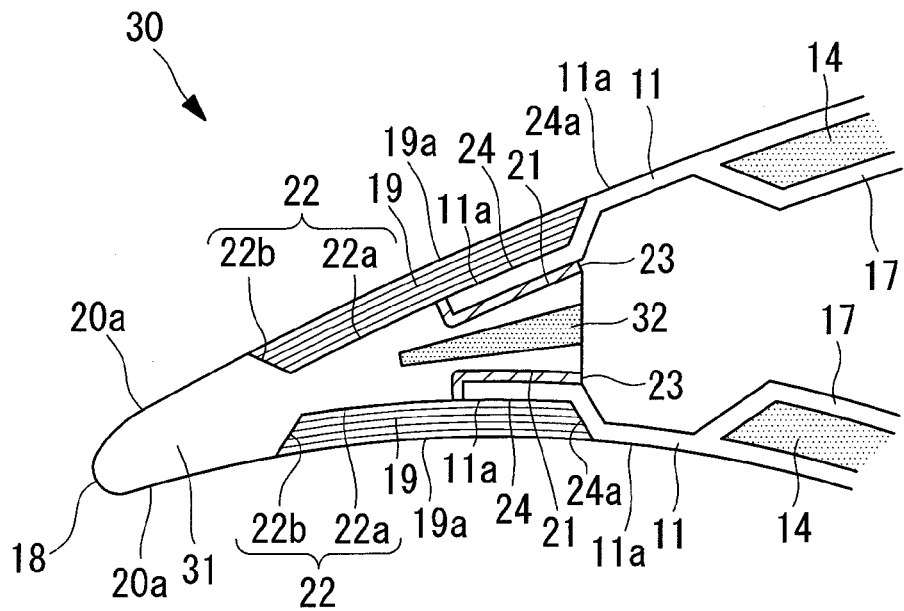
FIG. 4 is similar to FIG. 3, and is an enlarged sectional view of an essential portion of a wind turbine rotor blade according to a second embodiment.

FIG. 4 is similar to FIG. 3, and is an enlarged sectional view of an essential portion of the wind turbine rotor blade according to the second embodiment.

The wind turbine rotor blade 30 of the second embodiment is different from that of the first embodiment in that the wind turbine rotor blade 30 includes a trailing edge reinforcing material 31 instead of the trailing edge reinforcing material 20. Since other constituent elements are the same as those of the first embodiment, description of these constituent elements is omitted.

The same members as those of the first embodiment are designated with the same symbols.

As shown in FIG. 4, according to the trailing edge reinforcing material 31 of this embodiment, a portion of the trailing edge reinforcing material 20 (a central portion on an end on a leading edge side in this embodiment) is formed (configured) from a lightweight core material 32 made of resin foam body such as PVC or wood material such as balsa, and other configuration is the same as that of the above-described trailing edge reinforcing material 20.

According to the wind turbine rotor blade 30 of the embodiment, since the portion of the trailing edge reinforcing material 20 is made of the lightweight core material 32, the trailing edge reinforcing material 31 can be reduced in weight, and the entire wind turbine rotor blade 30 can be reduced in weight.

Since other effect is the same as that of the first embodiment, description thereof is omitted here.

A third embodiment of the wind turbine rotor blade of the invention will be described with reference to FIG. 5.

Figure 5:
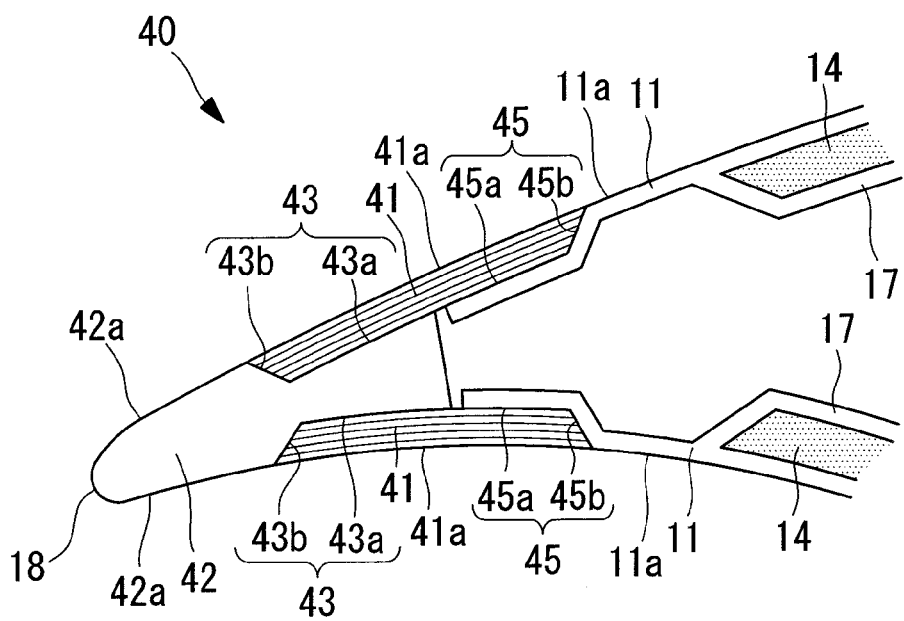
FIG. 5 is similar to FIG. 3, and is an enlarged sectional view of an essential portion of a wind turbine rotor blade according to a third embodiment of the invention.
Figure 6:
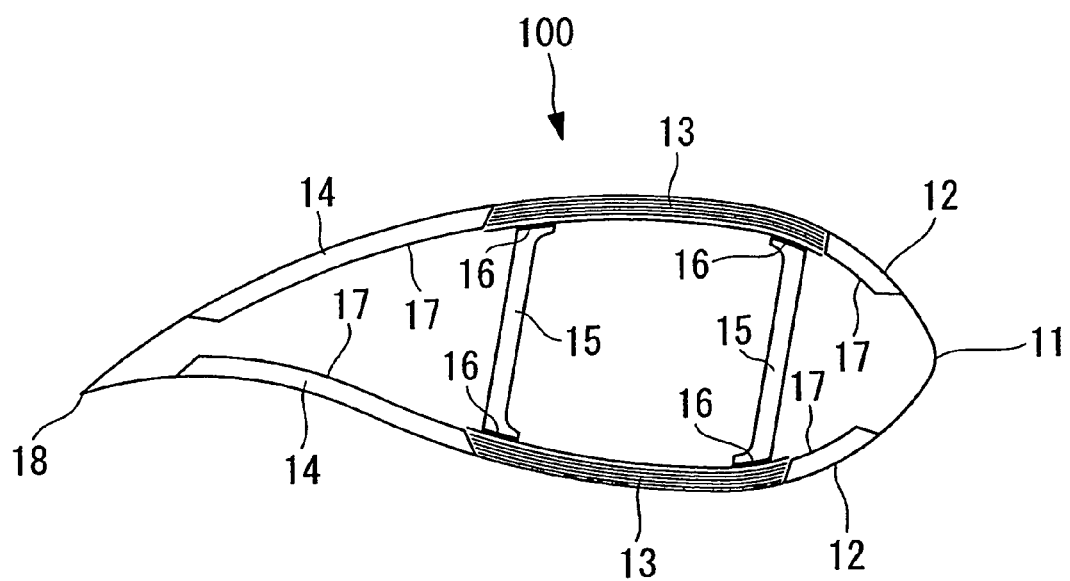
FIG. 6 is similar to FIG. 2, and is a sectional view showing a conventional wind turbine rotor blade.

FIG. 5 is similar to FIG. 3, and is an enlarged sectional view of an essential portion of the wind turbine rotor blade according to the third embodiment.

According to the wind turbine rotor blade 40 of this embodiment, a trailing edge reinforcing material 42 forming trailing edges together with later-described overlays 41 is provided (disposed) at locations closer to the trailing edge 18 than the trailing edge end of the trailing edge sandwich material 14.

As shown in FIG. 4, the trailing edge reinforcing material 42 is formed by laminating, on one another, many fiber-reinforced plastic layers in which reinforced fibers (not shown) are oriented in a blade longitudinal direction of the wind turbine rotor blade 40 (direction perpendicular to a sheet surface of FIG. 4). The trailing edge reinforcing material 42 includes a first recesses 43 in which one sides of the overlays 41 (on the side of the trailing edge) are accommodated. A depth of the first recess 43 is set such that the surface 11a of the outer skin material 11 which is exposed outside, the surface 41a of the overlay 41 and the surface 42a of the trailing edge reinforcing material 42 which is exposed outside form a (substantially) smooth continuous surface when the overlay 41 having a thickness required for connecting (coupling) the outer skin material 11 and the trailing edge reinforcing material 42 to each other is mounted on (connected (coupled) to) the first recess 43 and a later-described second recess 45. A side surface 43b of the first recess 43 extending from the bottom surface 43a of the first recess 43 toward the trailing edge side, the blade tip end side and the blade root side has a predetermined gradient (about ⅕ to ½₀) from the bottom surface 43a toward the surface 42a.

A second recess 45 in which the other side of the overlay 41 (on the side of leading edge) is formed in a tip end of the outer skin material 11. A depth of the second recess 45 is set such that the surface 11a of the outer skin material 11 which is exposed outside, the surface 41a of the overlay 41 and the surface 42a of the trailing edge reinforcing material 42 which is exposed outside form a (substantially) smooth continuous surface when the overlay 41 having a thickness required for connecting (coupling) the outer skin material 11 and the trailing edge reinforcing material 42 to each other is mounted on (connected (coupled) to) the first recess 43 and the second recess 45. A side surface 45b of the second recess 45 extending from the bottom surface 45a of the second recess 45 toward the leading edge side, the blade tip end side and the blade root side has a predetermined gradient (about ⅕ to ½₀) from the bottom surface 45a toward the surface 11a.

Each of the overlays 41 is formed by a hand lay-up method in which resin-impregnated reinforced fibers (such as carbon fibers, glass fibers and aramid fibers) are laminated on one another in a recess (mold) including the first recess 43 and the second recess 45 as shown in FIG. 5, the fibers are crumpled using a roller to squeeze out redundant resin and air, and the overlay 41 is left at room temperature and cured, or by a vacuum impregnation method in which laminated fibers are covered with a cover and vacuumed and impregnated with resins.

According to the wind turbine rotor blade 40 of the embodiment, since the trailing edge is configured (formed) from the strong trailing edge reinforcing material 42 which is less prone to be deformed, it is possible to enhance the bending rigidity of the trailing edge in the edge direction, to enhance the buckling strength of the trailing edge against a load in the edge direction, to bring a safety factor of the buckling strength close to a safety factor of the material strength, and to reduce the weight.

As a result, even if a width of the trailing edge sandwich material 14 (length in a cord direction (lateral direction in FIG. 2)) is increased, the buckling strength of the trailing edge sandwich material 14 against the load in the edge direction can be prevented from being lowered. Therefore, an interval between the sheer webs 15 in the cord direction, i.e., a distance between the sheer web 15 located on the side of the leading edge and the sheer web 15 located on the side of the trailing edge can be reduced (at that time, the super cap material 13 is thickened while equally maintaining the cross-sectional area of the super cap material 13), it is possible to reduce the width of the super cap material 13, and the buckling strength of the super cap material 13 against the load in the flap direction can be enhanced.

The tip end of the outer skin material 11 and the trailing edge reinforcing material 42 are strongly connected (coupled) to each other by the overlay 41 laminated in the first recess 43 and the second recess 45. Therefore, it is possible to prevent the trailing edge reinforcing material 42 from separating (disengaging) from the tip end of the outer skin material 11, and the reliability of the blade itself can be enhanced.

The overlay 41 is accommodated in the first recess 43 and the second recess 45 such that the surface 11a of the outer skin material 11 which is exposed outside, the surface 41a of the overlay 41 and the surface 42a of the trailing edge reinforcing material 42 which is exposed outside form the (substantially) smooth continuous surface. Therefore, the blade surface of the trailing edge can smoothly be maintained, and noise and drag generated when the blades rotate can be suppressed.

Further, since only the first recess 43 is formed in the trailing edge reinforcing material 42, the number of machining steps of the trailing edge reinforcing material 42 can be reduced to a minimum number, and the manufacturing efficiency can be enhanced.

According to the wind turbine rotor blade 40 of the embodiment, the reinforced fibers constituting the trailing edge reinforcing material 42 are arranged along the blade longitudinal direction. Therefore, it is possible to further enhance the bending rigidity of the trailing edge in the edge direction, and to further enhance the buckling strength of the trailing edge against the load in the edge direction. It is possible to bring the safety factor of the buckling strength close to the safety factor of the material strength, and the weight can further be reduced.

According to the wind-generating wind turbine 1 having the wind turbine rotor blades 40 of the embodiment, it is possible to reduce, in weight, the rotation bearing which connects the rotor head and the root portion of the wind turbine rotor blade to each other, and the connecting shaft (not shown) which is disposed in the rotor head and which gives rotating motion to the wind turbine blade. A load applied to the tower 2 which supports the wind turbine rotor blades 40 and the rotor head 4 can be reduced.

The present invention is not limited to the above-described embodiments, and the invention can variously be changed and modified within a range not departing from a subject matter of the invention.

For example, the trailing edge reinforcing materials 20, 31 and 42 can be applied not only to the wind turbine rotor blade having the structure shown in FIG. 1, but also be applied to a wind turbine rotor blade having sheer webs of box structure.

The trailing edge reinforcing materials 20, 31 and 42 can be applied to the wind turbine rotor blade having the trailing edge sandwich material 14, but also be applied to a wind turbine rotor blade having no trailing edge sandwich material 14.

What is claimed is:

1. A wind turbine rotor blade having a super cap structure, comprising:
   an outer skin material made of fiber-reinforced plastic,
   a sheer web,
   super cap materials, and
   a trailing edge reinforcing material made of fiber-reinforced plastic which forms a trailing edge, wherein the trailing edge reinforcing material includes:
   a first recess provided in a leading edge side of the trailing edge reinforcing material in which a trailing edge side end of the outer skin material is accommodated, and
   a second recess provided in a trailing edge side of the trailing edge reinforcing material in which a trailing edge side of an overlay, which is formed by laminating impregnated reinforced fibers on one another, is accommodated,
   a third recess in which a leading edge side of the overlay is accommodated is formed in a trailing edge side tip end of the outer skin material, and
   the tip end of the outer skin material is fixed to the first recess through an adhesive.

2. A wind turbine rotor blade having a super cap structure, comprising:
   an outer skin material made of fiber-reinforced plastic,
   a sheer web,
   super cap materials, and
   a trailing edge reinforcing material made of fiber-reinforced plastic which forms a trailing edge, wherein the trailing edge reinforcing material includes:
   a first recess provided in a leading edge side of the trailing edge of the trailing edge reinforcing material in which a trailing edge side of an overlay, which is formed by laminating resin-impregnated fibers on one another, is accommodated, and
   a second recess in which a leading edge side of the overlay is accommodated is formed in a trailing edge side tip end of the outer skin material.

3. The wind turbine rotor blade according to claim 1, wherein a surface of the outer skin material which is exposed outside, a surface of the overlay and a surface of the trailing edge reinforcing material which is exposed outside are formed such that these surfaces form a smooth continuous surface.

4. The wind turbine rotor blade according to claim 1, wherein a portion of the trailing edge reinforcing material is made of a core material selected from the group consisting of PVC and wood material.

5. A wind-generating wind turbine having the wind turbine rotor blade according to claim 1.

6. The wind turbine rotor blade according to claim 2, wherein a surface of the outer skin material which is exposed outside, a surface of the overlay and a surface of the trailing edge reinforcing material which is exposed outside are formed such that these surfaces form a smooth continuous surface.

7. The wind turbine rotor blade according to claim 2, wherein a portion of the trailing edge reinforcing material is made of core material selected from selected from the group consisting of PVC and wood material.

8. A wind-generating wind turbine having the wind turbine rotor blade according to claim 2.

\* \* \* \* \*